United States Patent [19]

Lee

[11] Patent Number: 4,755,291

[45] Date of Patent: * Jul. 5, 1988

[54] FILTRATION AND WASHING APPARATUS WITH ADJUSTABLE ROTARY FILTRATION CYLINDER

[76] Inventor: Chung Y. Lee, 375-21, Daebang-dong, Dongjak-ku, Seoul, Rep. of Korea

[*] Notice: The portion of the term of this patent subsequent to Oct. 7, 2003 has been disclaimed.

[21] Appl. No.: 8,010

[22] Filed: Jan. 29, 1987

[51] Int. Cl.[4] ............................................. B01D 33/06
[52] U.S. Cl. ............................... 210/179; 210/393; 210/403; 100/93 S
[58] Field of Search ............... 210/178, 179, 241, 374, 210/383, 393, 396, 408, 411, 412, 394, 403; 100/93 S, 112, 117

[56] References Cited

U.S. PATENT DOCUMENTS

| | | | |
|---|---|---|---|
| 869,720 | 10/1907 | Matthias | 210/394 |
| 1,594,999 | 8/1926 | Carter | 210/393 |
| 2,177,560 | 10/1939 | Coogan et al. | 210/383 |
| 4,248,709 | 2/1981 | Irving | 210/403 |
| 4,368,125 | 1/1983 | Murray | 210/374 |
| 4,615,801 | 10/1986 | Lee | 210/185 |

Primary Examiner—Richard V. Fisher
Assistant Examiner—Linda S. Evans
Attorney, Agent, or Firm—Birch, Stewart, Kolasch & Birch

[57] ABSTRACT

The present invention relates to a filtration apparatus which includes a tapered, rotary cylinder, a rotary filtration cylinder disposed around the tapered, rotary cylinder and a fixed steam injection pipe disposed above the rotary filtration cylinder whereby solid waste material which is conveyed in the rotary filtration cylinder and is heated, and which collects in the holes of the rotary filtration cylinder is cleaned away by spraying the surface of the rotary filtration cylinder with hot steam through the nozzles of a fixed injection pipe.

9 Claims, 1 Drawing Sheet

4,755,291

FILTRATION AND WASHING APPARATUS WITH ADJUSTABLE ROTARY FILTRATION CYLINDER

BACKGROUND OF THE INVENTION

The present invention relates to an improved filtration and washing apparatus which comprises a tapered rotary cylinder and a rotary filtration cylinder disposed around the tapered rotary cylinder. More particularly, the present invention relates to an improved filtration apparatus having a washing system which is actuated for cleaning solid waste material which collects in the holes of a rotary filtration cylinder by spraying the surface of the cylinder with hot steam and having a heating system which is actuated for heating the interior of a tapered rotary cylinder for dehydrating solid waste material filled in a treatment zone between the tapered rotary cylinder and the rotary filtration cylinder.

According to the U.S. Pat. No. 4,615,801 entitled "ROTARY FILTRATION MEANS IN THE FILTH CONDENSATION-DEHYDRATION APPARATUS" owned by the inventor of the present invention, a filtration apparatus is disclosed which includes cylinder disposed within a rotary filtration cylinder and a fixed filtration cylinder. However, since solid waste materials are filtered and dehydrated by the fixed filtration cylinder coaxially disposed around the rear portion of the tapered cylinder and since the fixed filtration cylinder does not contain a washing system for cleaning the holes disposed therein, dregs may fill in the small holes around the fixed filtration cylinder and therefore, the filtration effect is decreased during its operation and the system must be periodically shut down to remove the dregs from the holes. Thus, the filtration and dehydration efficiency is considerably reduced.

In order to eliminate the disadvantages mentioned above, according to the present invention, the filtration apparatus of the present invention is constructed with a rotary filtration cylinder disposed around a tapered rotary cylinder and a steam injection pipe disposed above the rotary cylinder whereby any solid waste material in the holes of the rotary filtration cylinder is heated and washed by spraying the surface of the rotary filtration cylinder with hot steam with injection nozzles. Thus, the filtration cylinder may be filtered and washed clean.

OBJECTS AND SUMMARY OF THE INVENTION

Accordingly, it is an object of the present invention to provide an improved filtration and washing apparatus.

Another object of the present invention is to provide a filtration and washing apparatus which is constructed for heating solid waste materials in a rotary filtration cylinder by spraying the surface of the rotary filtration cylinder with hot steam through a plurality of nozzles of a fixed steam injection pipe whereby the efficiency of the overall filtration and washing process of the apparatus are substantially improved.

A further object of the present invention is to provide a filtration and washing apparatus which is constructed with a moving support member for adjusting the treatment zone between the tapered rotary cylinder and the rotary filtration cylinder by moving toward to the inside direction thereof when the screws of the screw conveying cylinder are rubbed off.

Other objects and further scope of applicability of the present invention will become apparent from the detailed description given hereinafter. It should be understood, however, that the detailed description and specific examples, while indicating preferred embodiments of the invention, are given by way of illustration only, since various changes and modification within the spirit and scope of the invention will become apparent to those skilled in the art from this detailed description.

The present invention relates to a filtration apparatus comprising a tapered rotary cylinder, a rotary filtration cylinder disposed around the tapered rotary cylinder and a fixed steam injection pipe disposed above the rotary filtration cylinder whereby the solid waste material which is conveyed inside the rotary filtration cylinder and is heated, and which collects in the holes of the rotary filtration cylinder is cleaned away by the spraying the surface of the rotary filtration cylinder with hot steam through nozzles of a fixed injection pipe.

BRIEF DESCRIPTION OF THE INVENTION

The present invention will become more fully understood from the detailed description given hereinbelow and the accompanying drawings which are given by way of illustration only, and thus are not limitative of the present invention, and wherein:

FIG. 1 is a side view of the present invention containing cut-away portions in order to illustrate the construction of the apparatus of the present invention; and FIG. 2 is a cross-sectional view of the present invention, taken along the line A—A of FIG. 1.

DETAILED DESCRIPTION OF THE INVENTION

Figure 1:
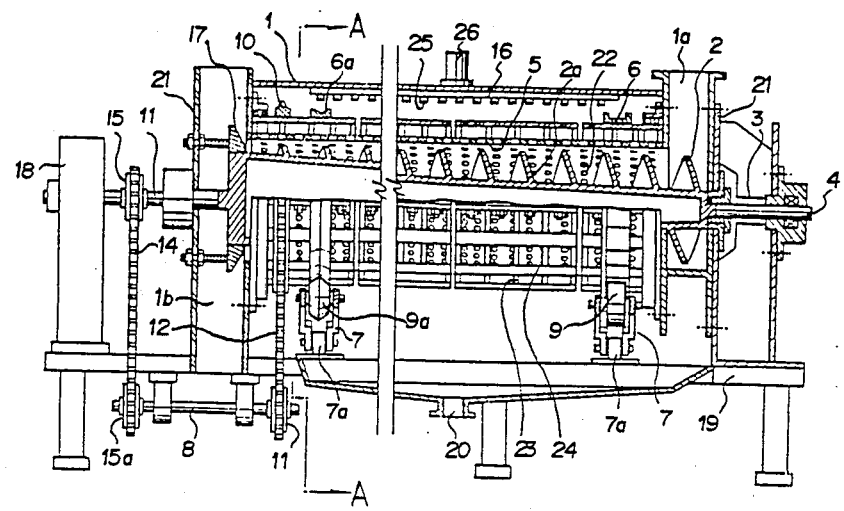
Figure 2:
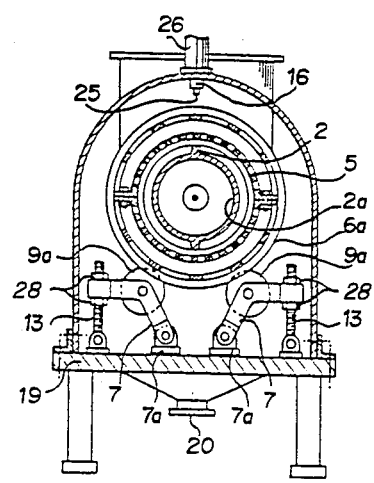

Referring now in detail to the drawings for the purpose of illustrating the present invention, the washing and filtration apparatus as shown in FIGS. 1 and 2 comprises a tapered rotary cylinder 2a having a plurality of conveying screws 2, an inlet 1a, an outlet 1b, a rotary filtration cylinder 5 disposed around the tapered rotary cylinder 2a, a housing means 1 enclosing the rotary filtration cylinder 5 and a fixed injection pipe 16 disposed above the rotary filtration cylinder 5. The tapered rotary cylinder 2a is attached to a support foundation 19 by front and rear tubular rotating shafts 3 so that the tapered rotary cylinder 2a can rotate. The support foundation 19 is provided with support members 21 disposed at a front and a rear portions thereof. The conveying screws 2 are gradually reduced in size from the inlet end 1a to the outlet end 1b. The rotary filtration cylinder 5 is positioned in close proximity to the circumference of the conveying screws 2a for conveying and grinding the solid waste material. The rotary filtration cylinder 5 includes a plurality of holes 22 therein for filtering the solid waste material. The rotary filtration cylinder 5 is provided with a plurality of rigid circumference members 23 disposed therearound and a plurality of rigid horizontal members 24 disposed between the front end and the rear end thereof for protecting the rotary filtration cylinder 5. Also, the rotary filtration cylinder 5 is provided with a V-shaped guiding track 6a disposed around the rear portion and a U-shaped guiding track 6 disposed around the front portion thereof. The V-shaped guiding track 6a is provided with a cylinder chain gear 10 disposed between the end of the rotary filtration cylinder 5 and the V-shaped guiding track 6a for a first chain gear 11 and a first chain 12 for slowly rotating the rotary filtration cylinder 5. The first chain gear 11 connects to a power transmission shaft 8. A second chain gear 15 connects to the edge of the power transmission shaft 8 and a third chain gear 15a connects to the second chain gear 15 placed on the tubular rotating shaft 3 through a second chain 14.

A control valve 17 of the outlet 1b and a speed reducing means 18 are connected to the tubular rotating shaft 3 through the support members 21. The rotary filtration cylinder 5 is provided with the U-shaped guiding track 6 and contacts to a flat driving roller 9 connected to the bent portion of the V-shaped moving support member 7. Also, the rotary filtration cylinder 5 is provided with the V-shaped guiding track 6a and contacts a tapered driving roller 9a connected to the bent portion of the V-shaped moving support member 7. The V-shaped moving support members 7 include one end thereof which pivotally connects to the support foundation 19 through a connecting member 7a and another end thereof which connects to stands 13 which include adjusting bolts 28 for moving the moving support members 7 toward the inside of the housing means 1.

The fixed steam injection pipe 16 is provided with a plurality of nozzles 25 for heating the solid waste material and cleaning away the dregs which collect in the holes 22 of the rotary filtration cylinder 5 during the filtration operation. The nozzles 25 spray hot steam introduced through the steam injection pipe 16 which connects to a steam supply line 26. The housing means 1 contains a drain pipe 20 for draining the liquid separated from the solid waste material.

Hot steam is introduced through a steam inlet pipe 4 for dehydrating and heating the solid waste material in the treatment zone between the tapered cylinder 2a and rotary filtration cylinder 5.

According to the present invention, the apparatus operates as follows: when the tubular rotating shaft 3 attached to the speed reducing means 18 and supported by the support members 21 which stand on the support foundation 19 is rotated by the motor (not seen), the tapered rotary cylinder 2a rotates at a high speed. The rotary filtration cylinder 5 also rotates at a low speed by engaging the first chain 12 of the first gear 11 and driving rollers 9 and 9a in the guiding tracks 6 and 6a disposed around the front and rear portions of the rotary filtration cylinder 5.

The solid waste material is supplied through the inlet is 1a formed on the front side of the housing means 1, and is filtered and dehydrated during its movement through the plurality of conveying screws 2.

Hot steam supplied through the steam supply line 26 sprays the surface of the rotary filtration cylinder 5 through nozzles 25 disposed at the steam injection pipe 16. Also, the hot steam supplied through the steam inlet pipe 4 simultaneously sprays and heats the interior of the tapered rotary cylinder 2a. In such cases, the protein in the waste product is dehydrated and dissolved leaving the solid waste materials mixed with water and dregs which are cleaned away from the holes 22.

The liquid which is filtered through the plurality of holes 22 of the rotary filtration cylinder 5 is thereby separated from the solid waste materials. Thus, the liquid is drained through the drain pipe 20 and the solid waste material is discharged through the outlet 1b.

According to present invention, since the hot steam sprays the surface of the slowly rotating rotary filtration cylinder 5 thereby heating and washing the rotary filtration cylinder and additional hot steam is supplied to the interior of the very fast rotating tapered rotary cylinder 2a further heating the treatment zone between the rotary filtration cylinder 5 and the tapered rotary cylinder 2a, the efficiency of the overall filtration and washing process is substantially improved and the tapered cylinder 2a is not cracked or transformed.

Furthermore, when the conveying screws 2 are rubbed off leaving a space between the conveying screws 2 and the rotary filtration cylinder 5, the space therebetween can be adjusted to increase grinding action by moving the V-shaped moving support members 7 toward to the inside of the rotary filtration cylinder 5 by adjusting the bolts 28.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A filtration apparatus for the treatment of liquid-containing waste material which comprises:
    a housing means,
    a rotary filtration cylinder disposed in said housing means having a surface which contains means defining a plurality of holes for receiving waste material to be treated and filtered,
    a tapered rotary cylinder rotatably disposed within said rotary filtration cylinder for rotating and conveying said waste material, wherein said rotary filtration cylinder and said tapered rotary cylinder define a treatment zone therebetween,
    waste material inlet means operatively associated with said housing means and said rotary filtration means for introducing waste material to be treated into said treatment zone,
    waste material outlet means operatively associated with said housing means and said rotary filtration means for removing waste material that has been treated from said treatment zone,
    steam supplying means operatively associated with said housing means,
    steam injection means fluidly communicating with said steam supplying means and said tapered rotary cylinder for introducing hot steam from said steam supplying means into said tapered rotary cylinder, wherein said tapered rotary cylinder is heated thereby heating said treatment zone and said waste material therein,
    a fixed steam cleaning pipe disposed contained in said housing means outside said rotary cylinder and fluidly communicating with said steam supplying means for washing said rotary filtration cylinder, said fixed steam cleaning pipe having a plurality of nozzles, wherein said fixed steam cleaning pipe sprays and washes clean said rotary filtration cylinder with hot steam through said nozzles with steam from said steam supplying means, and
    adjustment means provided in said housing means for adjusting the dimensions of said treatment zone between said rotary filtration cylinder and said tapered rotary cylinder.

2. The filtration apparatus of claim 1, wherein said rotary filtration cylinder includes a plurality of rigid circumference members and a plurality of rigid horizontal members disposed therearound.

3. The filtration apparatus of claim 1, wherein said tapered rotary cylinder includes a plurality of screws disposed thereon.

4. The filtration apparatus of claim 1, wherein said rotary filtration cylinder includes a front guiding track and a rear guiding track disposed around said rotary filtration cylinder and wherein said adjustment means comprises adjustable support members for supporting said rotary filtration cylinder in said housing means, said adjustable support members having driving rollers for contacting said front guiding track and said rear guiding track of said rotary filtration cylinder.

5. The filtration apparatus of claim 4, wherein a cylinder chain gear is disposed between said rear support track and the rear end of said rotary filtration cylinder, said cylinder chain gear engaging a power-driven chain so as to slowly rotate said rotary filtration cylinder in said housing means.

6. The filtration apparatus of claim 4, wherein said rear guiding track has a V-shaped configuration and said driving rollers which contact said rear guiding track are tapered so as to engage said rear guiding track.

7. The filtration apparatus of claim 4, wherein said front guiding track has a U-shaped configuration and said driving rollers which contract said front guiding track are flat so as to engage said front guiding track.

8. The filtration apparatus of claim 4, wherein said adjustable support members have a V-shaped configuration and wherein said driving rollers are positioned at the vertex of the V-shaped configuration.

9. The filtration apparatus of claim 4, wherein said housing means is disposed on a support foundation and wherein one end of each of said adjustable support members pivotally connects to said support foundation.

* * * * *